United States Patent
Shim et al.

(10) Patent No.: US 9,201,264 B2
(45) Date of Patent: Dec. 1, 2015

(54) LIQUID CRYSTAL DISPLAY, PANEL THEREFOR, AND MANUFACTURING METHOD THEREOF

(71) Applicant: Samsung Display Co., Ltd., Yongin, Gyeonggi-Do (KR)

(72) Inventors: Yi-Seop Shim, Suwon-si (KR); Kwang-Ho Lee, Seoul (KR); Jin-Seuk Kim, Daejeon (KR); Jang-Sub Kim, Suwon-si (KR); Yoon-Ho Kang, Yongin-si (KR); Tae-Gee Min, Seoul (KR); Seong-Gyu Kwon, Suwon-si (KR); Chang-Hun Kwak, Suwon-si (KR); Jae-Hoon Kim, Cheonan-si (KR); Jae-Jun Yu, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 1 day.

(21) Appl. No.: 14/163,109

(22) Filed: Jan. 24, 2014

(65) Prior Publication Data
US 2014/0141685 A1 May 22, 2014

Related U.S. Application Data

(62) Division of application No. 12/559,676, filed on Sep. 15, 2009, now abandoned.

(30) Foreign Application Priority Data

Dec. 8, 2008 (KR) .......................... 10-2008-0124032

(51) Int. Cl.
*G02F 1/13* (2006.01)
*G02F 1/1333* (2006.01)
(Continued)

(52) U.S. Cl.
CPC .... *G02F 1/133516* (2013.01); *G02F 1/133514* (2013.01); *G02F 1/13394* (2013.01); *G02F 1/133512* (2013.01)

(58) Field of Classification Search
CPC ................... G02F 1/133512; G02F 1/133514; G02F 1/133516; G02F 1/13394
USPC .................................. 349/106, 110, 155, 187
See application file for complete search history.

(56) References Cited

U.S. PATENT DOCUMENTS

| | | | |
|---|---|---|---|
| 6,630,274 B1 | 10/2003 | Kiguchi et al. | |
| 6,795,141 B2 | 9/2004 | Yamada | |
| 6,975,379 B2 | 12/2005 | Kim et al. | |

(Continued)

FOREIGN PATENT DOCUMENTS

| | | |
|---|---|---|
| JP | 2001-083499 A | 3/2001 |
| JP | 2001-091723 A | 4/2001 |

(Continued)

*Primary Examiner* — Nathanael R Briggs
(74) *Attorney, Agent, or Firm* — Cantor Colburn LLP

(57) ABSTRACT

A display panel includes a substrate, a partition formed on the substrate and defining a plurality of openings, a plurality of color filters formed in the openings and having a substantially uniform thickness within each respective opening, and a spacer formed on the partition. The color filters and the spacer are formed through inkjet printing. The color filters have the substantially uniform thickness by the partition having a height which is greater than the thickness of the color filters during the inkjet printing. The height of the partition may be in a range of about 1.5 to about 2 times the thickness of the color filter.

8 Claims, 11 Drawing Sheets

(51) Int. Cl.
*G02F 1/1335* (2006.01)
*G02F 1/1339* (2006.01)

(56) References Cited

U.S. PATENT DOCUMENTS

| | | |
|---|---|---|
| 7,126,662 B2 | 10/2006 | Choi et al. |
| 7,460,197 B2 | 12/2008 | Yi et al. |
| 7,705,958 B2 * | 4/2010 | Huang et al. .................. 349/155 |
| 2006/0033876 A1 * | 2/2006 | Park et al. ..................... 349/155 |
| 2009/0135352 A1 * | 5/2009 | Suzuki et al. ................. 349/106 |

FOREIGN PATENT DOCUMENTS

| | | |
|---|---|---|
| JP | 2001-166316 A | 6/2001 |
| JP | 2006-010876 A | 1/2006 |

* cited by examiner

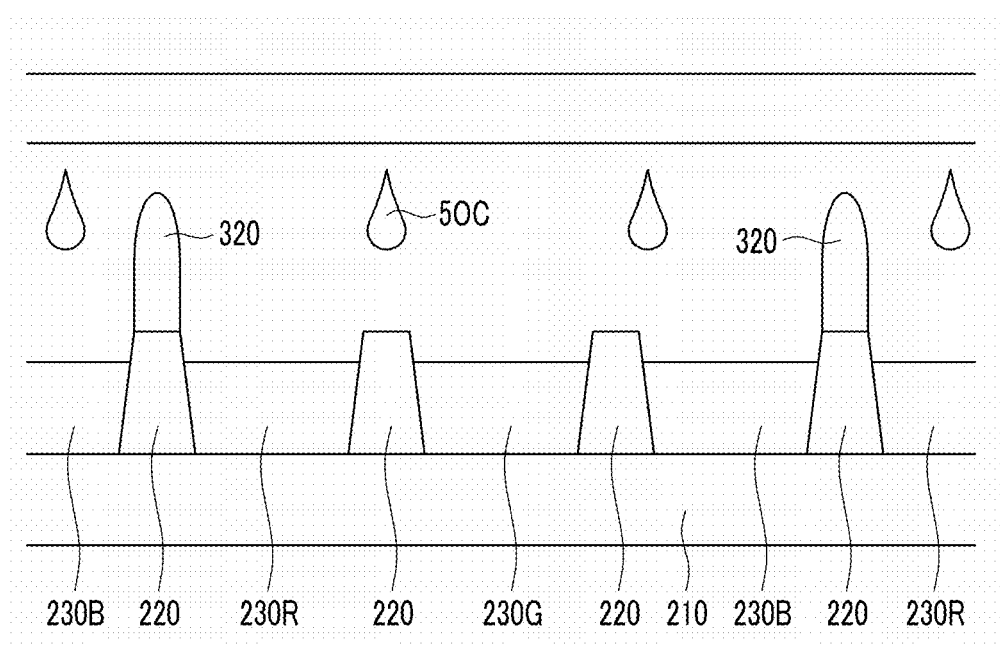

(a)

(b)

LIQUID CRYSTAL DISPLAY, PANEL THEREFOR, AND MANUFACTURING METHOD THEREOF

This application is a divisional application of U.S. application Ser. No. 12/559,676 filed Sep. 15, 2009, which claims priority to Korean Patent Application No. 10-2008-0124032 filed on Dec. 8, 2008, and all the benefits accruing therefrom under 35 U.S.C. §119, the entire contents of which are incorporated herein by reference.

BACKGROUND OF THE INVENTION (a) Field of the Invention

The present invention relates to a display panel for a liquid crystal display, a liquid crystal display, and a manufacturing method thereof.

(b) Description of the Related Art

A liquid crystal display includes a pair of display panels provided with field generating electrodes and polarizers, and a liquid crystal layer interposed between the two display panels. The field generating electrodes generate an electric field to the liquid crystal layer, and the arrangement of the liquid crystal molecules is changed according to the change of the intensity of the electric field. The arrangement of the liquid crystal molecules of the liquid crystal layer may be changed while applying the electric field, such that the polarization of the light passing through the liquid crystal layer is changed. The polarizers appropriately block or transmit the polarized light to form bright and dark regions, thereby displaying images.

Color filters of three primary colors such as red, green, and blue are formed on one display panel of a liquid crystal display.

Upper and lower panels of the liquid crystal display are supported by spacers disposed between the upper panel and the lower panel, thereby maintaining a cell gap between the display panels.

The spacers may be categorized as sphere-shaped bead spacers and column spacers which are formed in a predetermined pattern.

The bead spacers are sprayed arbitrarily on one of the two display panels before combining them.

BRIEF SUMMARY OF THE INVENTION

Where a liquid crystal display includes color filters of three primary colors such as red, green, and blue formed on one display panel, and spacers disposed between facing display panels, thereby maintaining a cell gap between the display panels, there may be technical difficulties and disadvantages in forming the liquid crystal display.

For example, the manufacturing cost is increased when forming the color filters by using additional photolithography steps, such as including inkjet printing. To form the color filters by using inkjet printing, inks of desired amounts of three primary colors such as red, green, and blue are jetted through a plurality of nozzles of an inkjet head, and the jetted inks are filled in regions enclosed by a light blocking member on a substrate. When using the inkjet printing system to form the color filters, repellant power of the ink against the surface of the light blocking member surface is generated such that the color filter is largely formed in the central portion of the region enclosed by the light blocking member as opposed to the edge of the region, and thereby the color filter may have a dome shape. Color filters with the dome shape may undesirably generate light leakage at the edge of pixel areas.

Additionally, to form the spacers, a photosensitive film is coated on the color filter array panel and is exposed and developed to form column spacers with the desired pattern, and the column spacers are disposed on portions where light is not transmitted, such as at positions corresponding to the channel portion of the thin film transistor, the gate line, and the storage electrode line. When forming the column spacers, additional photolithography steps are executed such that the manufacturing cost is increased by increasing the number of masks, and the manufacturing method of the liquid crystal display becomes complicated.

If bead spacers are arbitrarily sprayed, the bead spacers may be disposed on the display area of the liquid crystal display such that the light leakage is undesirably generated, thereby decreasing the contrast ratio of the screen. The bead spacers may be slightly moved when combining the two display panels or after combination such that the alignment layers of the display panel may be damaged.

Exemplary embodiments of the present invention provide a liquid crystal display, a panel therefor, and a manufacturing method thereof having advantages of maintaining a uniform cell gap, including spacers which are not formed at unwanted positions such as the pixel area, eliminating damage of the spacers to the alignment layer of the display panel resulting from movement, forming the spacers without increasing the number of steps of the manufacturing method and manufacturing cost, and including color filters having a substantially flat surface to reduce or effectively prevent light leakage at the pixel edge.

An exemplary embodiment of a color filter array panel for a liquid crystal display includes a substrate, a partition formed on the substrate and defining a plurality of openings, a plurality of color filters formed in the openings and having a substantially uniform thickness within each respective opening, and a spacer formed on the partition. The color filters and the spacer are formed through inkjet printing.

A height of the partition may be in a range of about 1.5 to about 2 times that of the thickness of the color filter.

The partition may be a light blocking member.

An overcoat formed on the partition and the color filter through inkjet printing may be further included.

A portion of the spacer may be covered and overlapped by the overcoat.

The spacer may include an acryl-based resin, cardo resin, or novolak resin.

An exemplary embodiment of a liquid crystal display includes a first substrate, a gate line and a data line formed on the first substrate, a thin film transistor connected to the gate line and the data line, a pixel electrode connected to the thin film transistor, a second substrate facing the first substrate, a light blocking member formed on the second substrate and defining a plurality of openings, a color filter formed in the openings and having a substantially uniform thickness in each respective opening, a common electrode formed on the color filter, and a spacer formed on the light blocking member. The color filter and the spacer are formed through inkjet printing.

A height of the light blocking member may be in a range of about 1.5 to about 2 times that of the thickness of the color filter.

An overcoat formed on the light blocking member and the color filter through inkjet printing may be further included.

The overcoat may be formed by using an ink having a viscosity of about 10 centipoise (cp) or less and a surface tension of about 25 millinewtons per meter (mN/m) or less.

An exemplary embodiment of a color filter array panel for a liquid crystal display includes a substrate, a partition formed on the substrate and defining a plurality of openings, and a plurality of color filters formed in the openings, each color filter having a substantially uniform thickness in a respective opening. A height of the partition is in the range of about 1.5 to about 2 times that of the thickness of the color filter.

The partition may be a light blocking member.

An exemplary embodiment of a liquid crystal display includes a first substrate, a gate line and a data line formed on the first substrate, a thin film transistor connected to the gate line and the data line, a pixel electrode connected to the thin film transistor, a second substrate facing the first substrate, a light blocking member formed on the second substrate and defining a plurality of openings, and a color filter formed in the openings and having a substantially uniform thickness, and a common electrode formed on the color filter. A height of the light blocking member is in a range of about 1.5 to about 2 times that of the thickness of the color filter.

An exemplary embodiment of a manufacturing method of a display panel for a liquid crystal display includes providing a substrate, forming a light blocking member on the substrate, and forming a color filter having a substantially uniform thickness in a region defined by the light blocking member through an inkjet printing method. A height of the light blocking member is in a range of about 1.5 to about 2 times that of the thickness of the color filter.

Forming a spacer on the light blocking member through by the inkjet printing method may be further included.

Forming an overcoat on the light blocking member and the color filter through the inkjet printing method may be further included.

An exemplary embodiment of a manufacturing method of a display panel for a liquid crystal display includes providing a substrate, forming a light blocking member on the substrate, forming a color filter in a region defined by the light blocking member through an inkjet printing method, and forming a spacer on the light blocking member by the inkjet printing method.

Forming an overcoat on the light blocking member and the color filter through the inkjet printing method may be further included.

The overcoat may be formed by using an ink having a viscosity of about 10 centipoise (cp) or less, and a surface tension of about 25 millinewtons per meter (mN/m) or less.

The overcoat may be formed by using an ink having a viscosity of about 3 centipoise (cp) to about 5 centipoise (cp), and a surface tension of about 20 millinewtons per meter (mN/m) to about 23 millinewtons per meter (mN/m).

Forming a common electrode on the overcoat may be further included.

The forming of the common electrode may include depositing a transparent conductive layer on the overcoat and the spacer, and removing the transparent conductive layer on the spacer.

A height of the light blocking member is in a range of about 1.5 to about 2 times that of the thickness of the color filter.

In an exemplary embodiment of the present invention, the color filter and the spacer are formed through the inkjet printing system such that the spacer may be formed on the desired position without increasing the number of steps of the manufacturing method and the manufacturing cost, and the surface of the color filter formed through the inkjet printing method may be planarized by controlling the height of the light blocking member, thereby preventing the light leakage on the edge of the pixel area.

BRIEF DESCRIPTION OF THE DRAWINGS

FIG. 5A to FIG. 5G are cross-sectional views sequentially showing a color filter array panel in an exemplary embodiment of a manufacturing process of the color filter array panel of a liquid crystal display, according to the present invention.

DETAILED DESCRIPTION OF THE INVENTION

Figure 1:
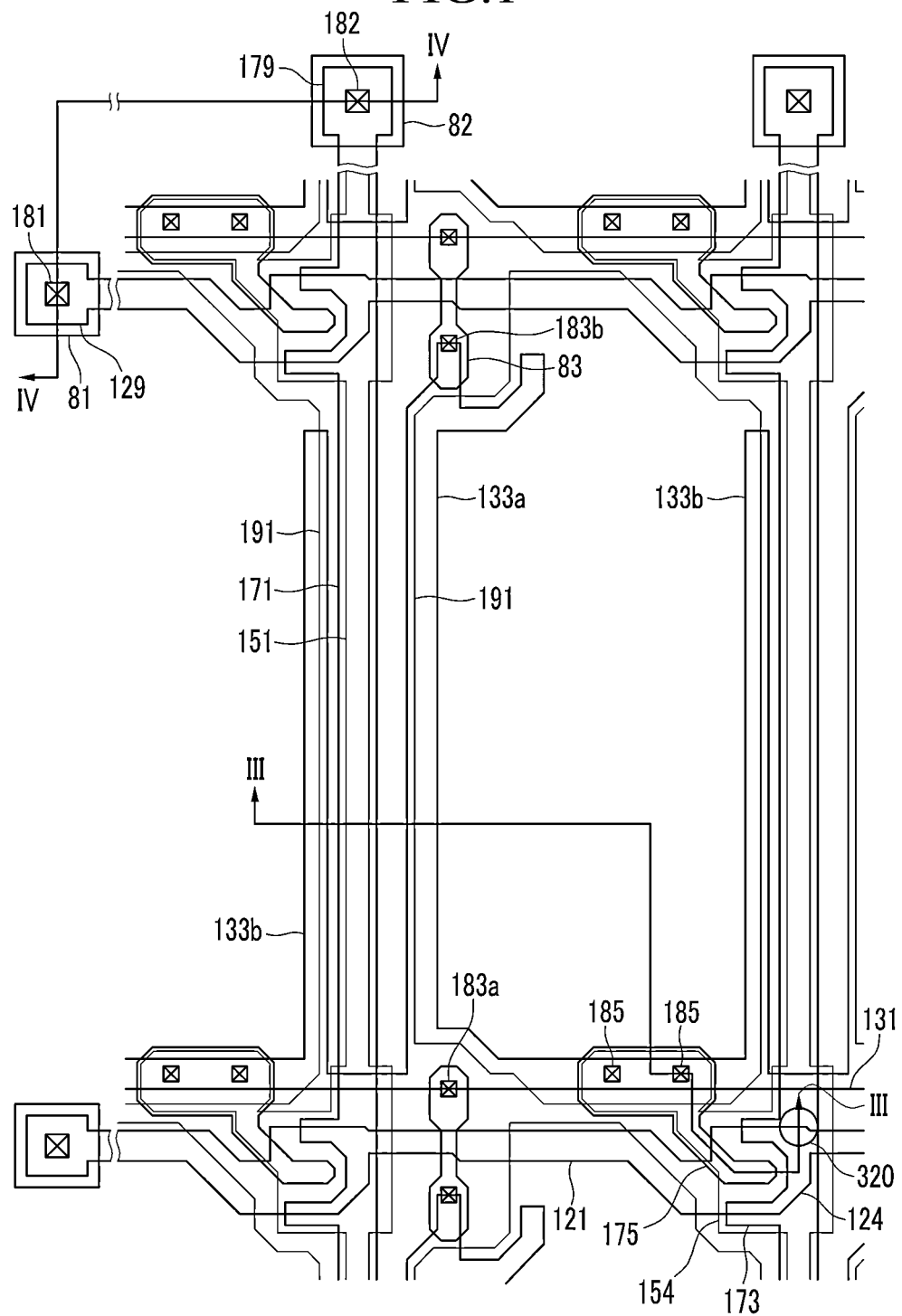
FIG. 1 is a layout view of an exemplary embodiment of a liquid crystal display, according to the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "under," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "under" relative to other elements or features would then be oriented "above" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

An exemplary embodiment of color filter array panel for a liquid crystal display and a liquid crystal display including the same, according to the present invention will be described with reference to FIG. 1 to FIG. 4.

Figure 2:
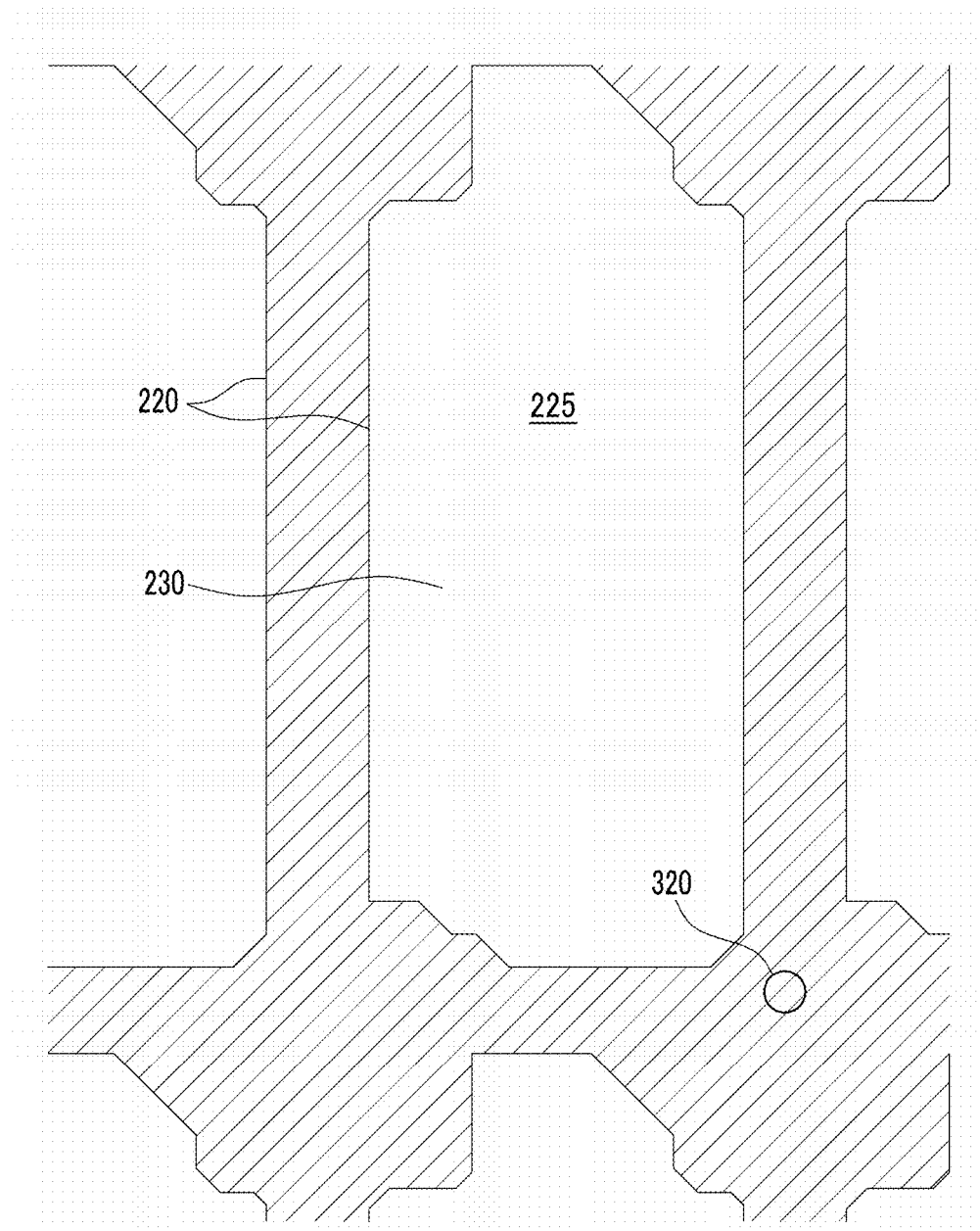
FIG. 2 is a layout view of an exemplary embodiment of a color filter array panel of a liquid crystal display, according to the present invention.
Figure 3:
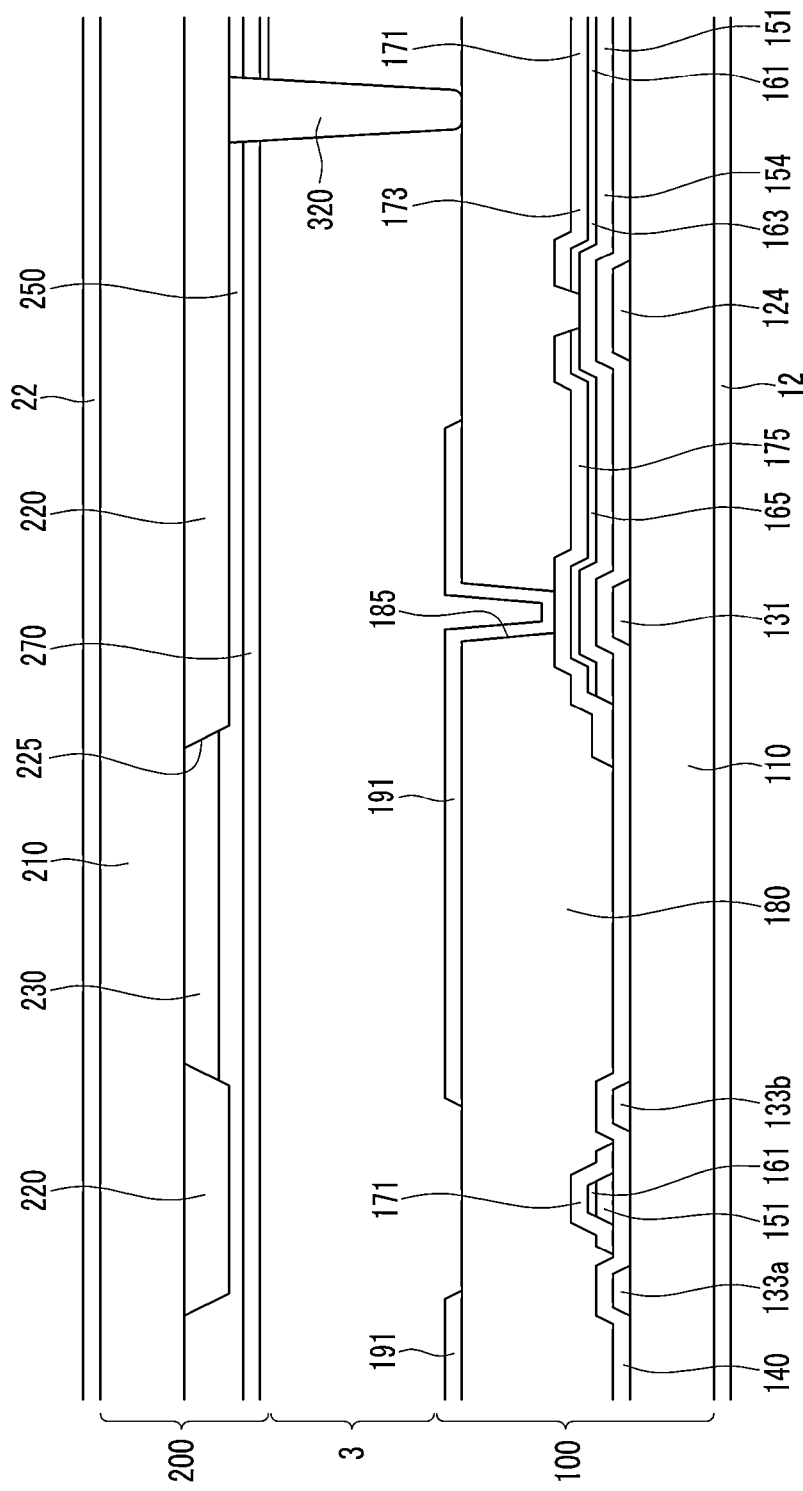
FIG. 3 is a cross-sectional view of the liquid crystal display shown in FIG. 1 taken along line III-III.
Figure 4:
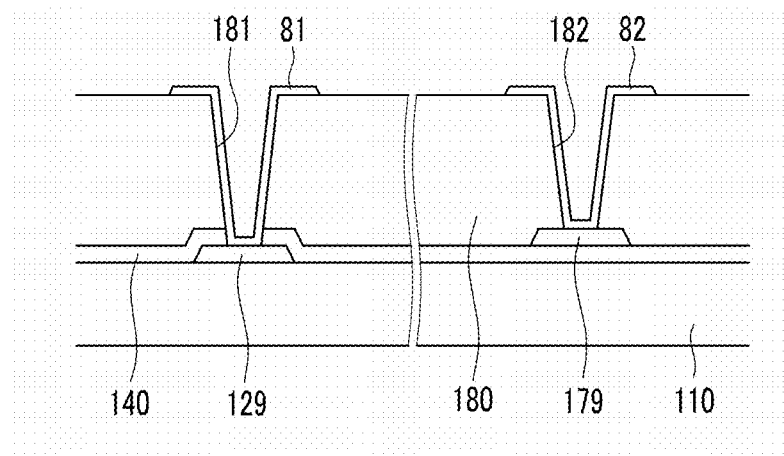
FIG. 4 is a cross-sectional view of the liquid crystal display shown in FIG. 1 taken along line IV-IV.

FIG. 1 is a layout view of an exemplary embodiment of a liquid crystal display according to the present invention, FIG. 2 is a layout view of an exemplary embodiment of a color filter array panel of a liquid crystal display according to the present invention, FIG. 3 is a cross-sectional view of the liquid crystal display shown in FIG. 1 taken along line III-III, and FIG. 4 is a cross-sectional view of the liquid crystal display shown in FIG. 1 taken along line IV-IV.

A liquid crystal display according to the illustrated exemplary embodiment includes a thin film transistor array panel 100 and a common electrode panel 200 facing to each other, and a liquid crystal layer 3 interposed therebetween.

The thin film transistor array panel 100 for the liquid crystal display will be described with reference to FIG. 1, FIG. 3, and FIG. 4.

A plurality of a gate line 121 and a plurality of a storage electrode line 131 are disposed on an insulation substrate 110, which may include transparent glass or plastic.

The gates lines 121 transfer gate signals and extend substantially in a transverse (first) direction. Each of the gate lines 121 include a plurality of a gate electrode 124 which are each protruded downward in the layout view, and an end portion 129 including a relatively wide area taken in the transverse and/or a longitudinal (second) direction in comparison to the gate line 121, for connecting with other layers or external driving circuits of the liquid crystal display. The gate electrodes 124 and the end portion 129 are each disposed continuously with the respective gate line 121, such as to form a single, continuous and indivisible member.

A gate driving circuit (not shown) which generates a gate signal may be mounted on a flexible printed circuit film (not shown) attached to the insulation substrate 110 or mounted directly on the insulation substrate 110, or may be integrated on the insulation substrate 110. When the gate driving circuit is integrated on the insulation substrate 110, it may be directly connected to the gate lines 121. As used herein, the term integrated defines combined in a single, continuous and indivisible member.

The storage electrode lines 131 receive a predetermined voltage and include a stem extending substantially parallel to the gate lines 121, and a plurality of a pair of a first and a second storage electrode 133a and 133b branching off from the stem. Each of the storage electrode lines 131 is disposed between two adjacent gate lines 121 in the layout view, and the stem of the storage electrode line 131 is placed closer to the lower one of the two adjacent gate lines 121.

The first and second storage electrodes 133a and 133b are each disposed continuously with the respective storage electrode line 131, such as to form a single, continuous and indivisible member. Each of the first and second storage electrodes 133a and 133b includes a fixed first end connected to the stem, and a free second (distal) end opposite to the fixed end. The fixed end of the first storage electrode 133a includes a relatively wide area in the transverse and/or longitudinal direction, and the free end is divided into two portions, including a straight portion and a bent portion. However, the shape and arrangement of the storage electrode lines 131 may be variously changed.

In an exemplary embodiment, the gate lines 121 and the storage electrode lines 131 may include an aluminum-based metal of aluminum (Al) or aluminum alloys, a silver-based metal of silver (Ag) or silver alloys, a copper-based metal of copper (Cu) or copper alloys, a molybdenum-based metal of molybdenum (Mo) or molybdenum alloys, chromium (Cr), tantalum (Ta), titanium (Ti), etc.

The gate lines 121 and the storage electrode lines 131 may include a multi-layered structure including two conductive films (not shown) having different physical characteristics. In an exemplary embodiment, one of the conductive layers may include a metal having low resistivity, such as an aluminum-based metal, a silver-based metal, or a copper-based metal, in order to reduce signal delay or voltage drop. Unlike the above, other conductive layers may include a material having good physical, chemical, and electrical contact characteristics particularly with indium tin oxide ("ITO") and indium zinc oxide ("IZO"), such as a molybdenum-based metal, chromium, tantalum, titanium, or the like. In one exemplary embodiment, the combination may include a lower chromium film and an upper aluminum (alloy) film, and a lower aluminum (alloy)

film and an upper molybdenum (alloy) film. However, the gate lines 121 and the storage electrode lines 131 may be made of various metals or conductors.

Referring to FIGS. 3 and 4, side surfaces of the gate lines 121 and the storage electrode lines 131 are inclined to a planar surface of the insulation substrate 110, and an inclination angle thereof may be about 30° to about 80°.

A gate insulating layer 140 is disposed directly on the gate lines 121 and the storage electrode lines 131. The gate insulating layer 140 may include silicon nitride ("SiNx") or silicon oxide ("SiOx".)

A plurality of a semiconductor stripe 151 are disposed directly on the gate insulating layer 140. The semiconductor strips 141 may include hydrogenated amorphous silicon (a-Si is an abbreviation for amorphous silicon), polysilicon, etc. The semiconductor stripes 151 longitudinally extend in the longitudinal direction in the layout view, and include a plurality of projections 154 which are extended from a semiconductor strip 151 toward the gate electrodes 124. Each semiconductor stripe 151 is increased in width taken in the transverse and/or longitudinal direction near the gate line 121 and the storage electrode line 131, such that a portion of the semiconductor stripe 151 having the increased width substantially overlaps the gate line 121 and/or the storage electrode line 131.

A plurality of an ohmic contact stripe 161 and a plurality of an ohmic contact island 165 are disposed on the semiconductor stripes 151, respectively. The ohmic contact stripes 161 and the ohmic contact islands 165 may include a material such as n+ hydrogenated amorphous silicon in which an n-type impurity such as phosphor is doped with a high density, or a material such as silicide. The ohmic contact stripes 161 include a plurality of projections 163. A projection 163 and an ohmic contact island 165 are disposed as a pair on the projections 154 of the semiconductor stripes 151, respectively. The pair of the projection 163 and the ohmic contact island 165 substantially overlap an entire of the projections 154.

Sides at boundaries of the semiconductor stripes 151 and sides at boundaries of the ohmic contact stripes and islands 161 and 165 are each sloped to the planar surface of the insulation substrate 110, and the slope angle may be about 30° to about 80°.

A plurality of a data line 171 and a plurality of a data electrode 175 are disposed on the ohmic contact stripes and islands 161 and 165 and the gate insulation layer 140.

The data lines 171 transfer data signals and longitudinally extend in the longitudinal direction, thereby intersecting the gate lines 121. Each data line 171 crosses a storage electrode line 131 and is disposed between adjacent storage electrodes 133a and 133b, in the layout view. Each data line 171 includes a plurality of a source electrode 173 extending toward the gate electrodes 124, a plurality of a drain electrode 175 and an end portion 179 including a relatively wide area in the transverse and/or longitudinal direction for connection with a different layer or an external driving circuit of the liquid crystal display device. The source electrodes 173 and the end portion 179 are each disposed continuously with the respective data line 171, such as to form a single, continuous and invisible member.

A data driving circuit (not shown) which generates a data signal may be mounted on a flexible printed circuit film (not shown) attached on the insulation substrate 110, mounted directly on the insulation substrate 110, or integrated on the insulation substrate 110. Where the data driving circuit is integrated on the insulation substrate 110, the data lines 171 may be elongated to be physically and electrically connected therewith.

The drain electrodes 175 are disposed separated from the data lines 171 and face the source electrodes 173 with respect to the gate electrodes 124. Each drain electrode 175 includes a first end portion which is relatively large in the transverse and/or longitudinal direction, and a second end portion opposing the first end portion which has a substantially bar shape. The relatively large first end portion overlaps with a storage electrode line 131, and the bar-shaped end portion is partially surrounded by a portion of the source electrode 173 which is bent, in the layout view.

One gate electrode 124, one source electrode 173, and one drain electrode 175 collectively define a thin film transistor ("TFT"), together with the protrusion 154 of the semiconductor stripe 151. A channel of the TFT is formed exposing the projection 154 disposed between the source electrode 173 and the drain electrode 175.

The drain lines 171 and the drain electrodes 175 include a refractory metal, such as molybdenum, chromium, tantalum, and titanium, or their alloys, and may include a multi-layer structure including a refractory metal film (not shown) and a low-resistance conductive layer (not shown). Exemplary embodiments of the multi-layer structure may include a double-layer of a chromium or molybdenum (alloy) lower film and an aluminum (alloy) upper film, and a triple-layer of a molybdenum (alloy) lower film, an aluminum (alloy) intermediate layer, and a molybdenum (alloy) upper film. In alternative embodiments, the data lines 171 and the drain electrodes 175 can be made of various other metals or conductors.

Sides at boundaries of the data lines 171 and the sides at boundaries of the drain electrodes 175 are sloped to the planar surface of the insulation substrate 110 at a slope angle of about 30° to about 80°.

The ohmic contact stripes and islands 161 and 165 exist only between the underlying semiconductor stripes 151 and the overlying data lines 171, and between the underlying semiconductor stripes 151 and the overlying drain electrodes 175 to lower contact resistance therebetween, respectively. Referring to FIGS. 1 and 3, a majority of each semiconductor stripe 151 is narrower in the transverse direction than the data line 171, however, the portion of the semiconductor stripe 151 which overlaps the gate line 121 has a relatively large width when compared to the majority (e.g., remainder) of the semiconductor strip 151, smoothing a profile of the surface, so that disconnection of the data line 171 can be reduced or effectively prevented. Portions of each semiconductor stripe 151, including, but not limited to, a portion between the source electrode 173 and the drain electrode 175, are exposed, without being covered by the data line 171 and the drain electrode 175.

A passivation layer 180 is disposed on and directly contacting the data lines 171, the drain electrodes 175, and the exposed portions of the semiconductor stripes 151. The passivation layer 180 may include an inorganic insulator or an organic insulation material, etc., and may have a substantially planarized upper surface. Exemplary embodiments of an inorganic insulator include, but are not limited to, silicon nitride and silicon oxide. The organic insulator can have photosensitivity, and a dielectric constant not greater than about 4.0. The passivation layer 180 may also include a dual-layered structure of a lower inorganic layer and an upper organic layer, so that it may not damage the exposed portion of the semiconductor stripe 151, while still sustaining the excellent insulation characteristics of the organic layer.

The passivation layer 180 includes a plurality of a contact hole 182 and a contact hole 185 disposed completely through the passivation layer 180 in a third direction orthogonal to both the transverse and longitudinal direction. The contact holes 182 and 185 expose the end portions 179 of the data lines 171 and the drain electrodes 175.

The passivation layer 180 and the gate insulating layer 140 include a plurality of a contact hole 181, a plurality of a contact hole 183a and a plurality of a contact hole 183b each disposed completely through the passivation layer 180 and the gate insulating layer 140 in the third direction. The contact holes 181 expose the end portions 129 of the gate lines 121. The contact holes 183a expose portions of the storage electrode lines 131 near the fixed ends of the first storage electrodes 133a, and the contact holes 183b expose the projections of the free ends of the first storage electrodes 133a.

A plurality of a pixel electrode 191, a plurality of an overpass 83, a plurality of a contact assistant 81 and a plurality of a contact assistant 82 are disposed on and directly contacting the upper surface of the passivation layer 180. Each of the pixel electrodes 191, the overpasses 83, and the contact assistants 81 and 82 may include a transparent conductive material such as ITO or IZO, or a reflective metal such as aluminum, silver, chromium, or alloys thereof.

The pixel electrode 191 is physically and electrically connected with the drain electrode 175 through the contact hole 185, and receives a data voltage from the drain electrode 175. The pixel electrode 191 applied with the data voltages generates an electric field along with a common electrode 270 of the common electrode panel 200 which receives a common voltage, to thereby determine a direction of the liquid crystal molecules (not shown) of the liquid crystal layer 3 between the pixel electrode 191 and the common electrode 270. Polarization of light which transmits through the liquid crystal layer 3 can be varied according to the determined direction of the liquid crystal molecules. The pixel electrode 191 and the common electrode 270 form a capacitor (referred to hereinafter as 'liquid crystal capacitor') to sustain the applied voltages even after the TFT is turned off.

The pixel electrode 191 overlaps with the storage electrode line 131 as well as with the storage electrodes 133a and 133b. A capacitor, collectively formed as the pixel electrode 191 and the drain electrode 175 electrically connected to the pixel electrode 191 overlap with the storage electrode line 131, is referred to as a storage capacitor, and the storage capacitor enhances a voltage sustaining capability of the liquid crystal capacitor.

The contact assistants 81 and 82 are connected with the end portion 129 of the gate line 121 and the end portion 179 of the data line 171 through the contact holes 181 and 182, respectively. The contact assistants 81 and 82 complement bonding characteristics of the end portion 129 of the gate line 121 and the end portion 179 of the data line 171 with an external device, and protect them. The overpass 83, traversing (e.g., overlapping) the gate line 121 in the longitudinal direction, is physically and electrically connected with the exposed portion of the storage electrode line 131 and the exposed end portion of the free end of the first storage electrode 133a via the contact holes 183a and 183b respectively positioned at opposing sides of the gate line 121 in the layout view. The storage electrode line 131 as well as the first and second storage electrodes 133a and 133b may be used together with the overpass 83, to repair a defect of the gate line 121, the data line 171, and/or the TFT.

The common electrode panel 200 will now be described with reference to FIGS. 2 and 3.

A light blocking member 220 is disposed on an insulation substrate 210 which may include transparent glass or the like. The light blocking member 220 is also referred to as a black matrix, and reduces or effectively prevents light leakage.

The light blocking member 220 includes a plurality of an opening 225 facing and overlapping the pixel electrodes 191 in the layout view of the liquid crystal display. Each of the openings 225 may have substantially the same shape (e.g., outline in the layout view) as the pixel electrodes 191. The light blocking member 220 including the openings 225 reduces or effectively prevents light leakage between adjacent pixel electrodes 191. The light blocking member 220 may include a portion corresponding to and overlapping with the gate lines 121 and the data lines 171, and a portion corresponding to and overlapping the TFTs.

The light blocking member 220 functions to enclose the ink for a color filter within the openings 225 during an exemplary embodiment of a manufacturing process of the color filter array panel using an inkjet printing system. The light blocking member 220 may include an organic layer including black pigments.

A plurality of color filters 230 are also disposed on the insulation substrate 210. The color filters 230 are positioned substantially inside a region surrounded by the light blocking member 220 in the layout view, and may longitudinally extend along the longitudinal direction of the pixel electrodes 191. Each color filter 230 may display one of the primary colors, i.e., red, green, or blue. Within each opening 225 defined by the light blocking member 220, a color filter 230 has substantially a uniform thickness and a planarized upper surface. It is preferable that the color filters 230 are formed by using the inkjet printing system, but the invention is not limited thereto.

In an exemplary embodiment, a height of the light blocking member 220 taken in the third direction is in a range of about 1.5 to about 2 times that of a thickness of the color filters 230 in the third direction.

A plurality of a spacer 320 is disposed on and directly contacting a portion of an upper surface of the light blocking member 220. A portion of the spacers 320 may also directly contact portions of the common electrode. The spacers 320 may include an acryl-based resin, cardo resin, or novolak resin, and are preferably made by using the inkjet printing system.

An overcoat 250 is disposed on and directly contacting the color filters 230 and the light blocking members 220. The overcoat 250 is disposed on substantially a whole of the insulation substrate 210. The overcoat 250 may include an (organic) insulator, reduces or effectively prevents exposure of the color filters 230, and provides a substantially planarized surface of the common electrode panel 200.

In an exemplary embodiment, the overcoat 250 is formed by using the inkjet printing system. The overcoat 250 preferably includes an organic material having viscosity about 10 centipoise (cp) or less, and more preferably in a range of about 3 cp to about 5 cp. A surface tension of the organic material for the overcoat 250 may preferably be about 25 millinewtons per meter (mN/m) or less, and more preferably in a range of about 20 mN/m to about 23 mN/m. If the viscosity of the material of the overcoat 250 is relative high and the surface tension is relatively large, when forming the overcoat 250 by using the inkjet printing system, it is difficult to form the planarized surface. However, the overcoat 250 of the liquid crystal display according to the illustrated embodiment of the present invention, has the viscosity of about 10 cp or less and the surface tension of about 25 mN/m or less, such that the overcoat 250 may be planarized.

The common electrode 270 is disposed directly on and contacting the overcoat 250, and overlaps substantially the whole of the insulation substrate 210. The common electrode 270 may include a transparent conductor such as ITO, IZO, or the like. The common electrode 270, and the pixel electrode 191 and passivation layer 180, may define the innermost layers of the common electrode panel 270 and the thin film transistor array panel 100, respectively.

Alignment layers (not shown) are respectively coated on each of the inner surfaces of the two display panels 100 and 200, and may be horizontal or vertical alignment layers. polarizers 12 and 22 are attached on each of outer surfaces of the two display panels 100 and 200, respectively. In the illustrated embodiment, it is preferable that the transmissive axes of the two polarizers 12 and 22 are perpendicular to each other, and that one of the transmissive axes is parallel to the gate lines 121. Where the liquid crystal display is of a reflective liquid crystal display ("LCD"), one of the two polarizers 12 and 22 can be omitted.

In an alternative embodiment, the liquid crystal display may include a phase retardation film (not shown) for compensating delay of the liquid crystal layer 3. The liquid crystal display may include a backlight unit (not shown) for providing light to the polarizers 12 and 22, the phase retardation film, the display panels 100 and 200, and the liquid crystal layer 3.

In the illustrated exemplary embodiment, the light blocking member 220 and the color filter 230 are included in the common electrode panel 200 facing the thin film transistor array panel 100. However, the color filter 230 may be disposed in the thin film transistor array panel 100 of the liquid crystal display, according to an alternative exemplary embodiment of the present invention. In one exemplary embodiment, it is preferable that the color filters 230 are formed by using the inkjet printing system, and that the height of a partition enclosing the color filters 230 is in the range of about 1.5 to 2 times that of the thickness the color filters 230.

Next, an exemplary embodiment of a manufacturing method of a common electrode panel 200 of a liquid crystal display according to the present invention will be described with reference to FIG. 5A to FIG. 5G.

FIG. 5A to FIG. 5G are cross-sectional views sequentially showing a color filter array panel in an exemplary embodiment of a manufacturing progress the color filter array panel of a liquid crystal display according to the present invention.

Figure 5A:
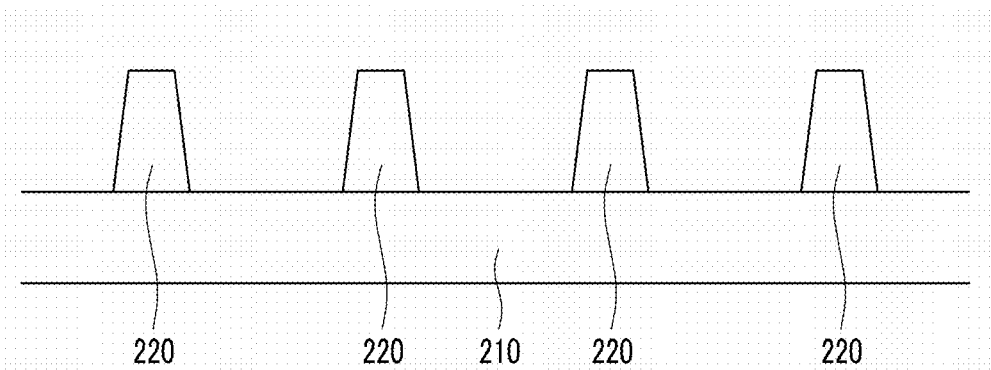

Referring to FIG. 5A, a light blocking member 220 is formed on the substrate 210. The light blocking member 220 may be made of an organic material including black pigments. The upper surface of the light blocking member 200 may have a relative large repellant power against a liquid. The repellant power of the light blocking member 220 may be controlled by mixing an additive agent or a leveling agent.

Figure 5B:
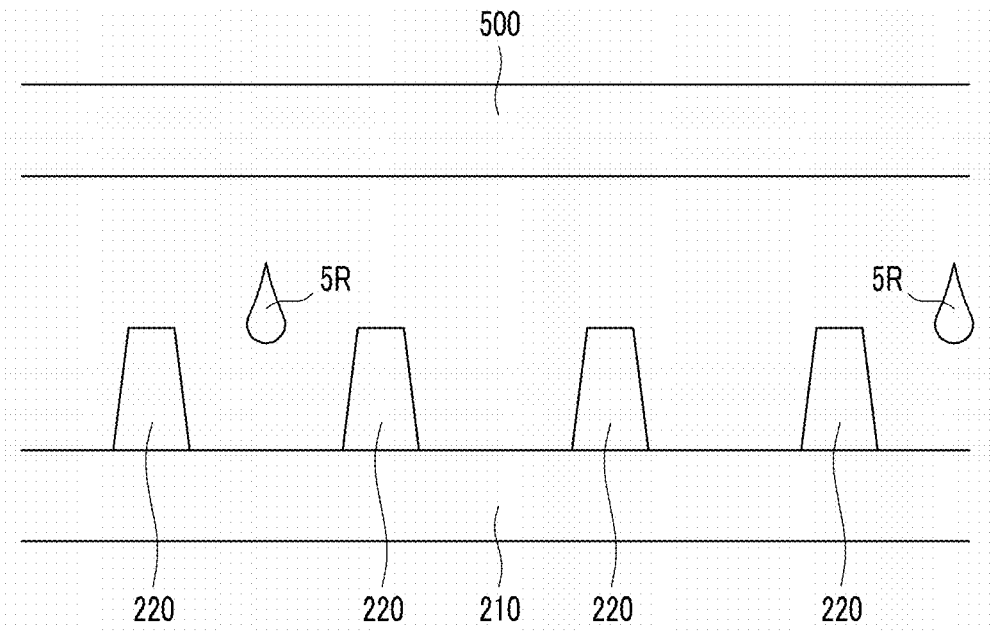
Figure 5C:
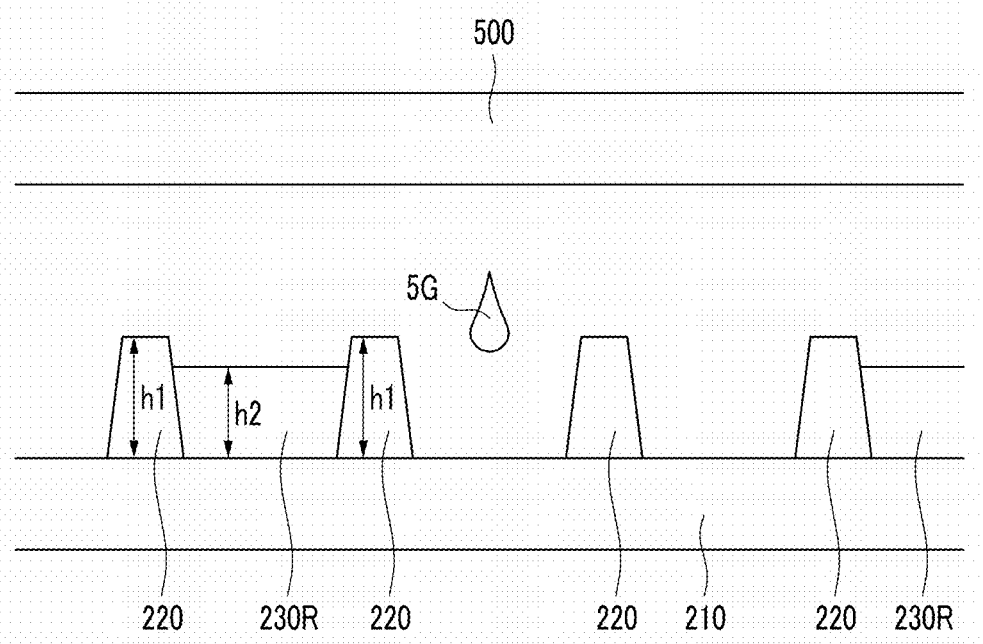

Referring to FIG. 5B, a first ink 5R including a pigment displaying red as the first color among color filters 230 and a solvent is deposited (e.g., sprayed) in openings 225 defined by the light blocking member 220, through nozzles of a head of an inkjet printing system 500. The printed first ink 5R for the color filter 230 is hardened to evaporate the solvent of the first ink 5R, thereby forming a first color filter 230R in first openings 225, as shown in FIG. 5C. A height h1 of the light blocking member 220 is in a range of about 1.5 to 2 times that of a thickness h2 of the first color filter 230R.

Figure 5D:
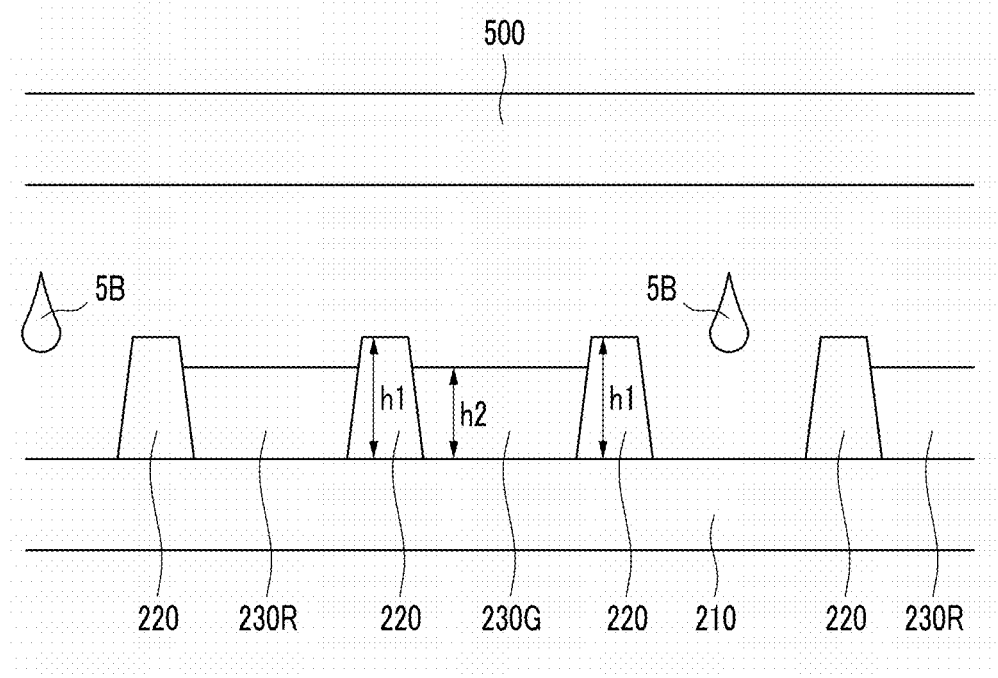

Referring to FIG. 5C, a second ink 5G for a second color filter 230G displaying green as the second color among the color filters 230 is sprayed in second openings 225 different from the first openings of the substrate 210 which includes the first color filter 230R. The printed second ink 5G for the second color filter 230G is hardened to evaporate the solvent of the second ink 5G thereby forming the second color filter 230G, as shown in FIG. 5D. The height h1 of the light blocking member 220 is in the range of about 1.5 to 2 times that of a thickness h2 of the second color filter 230G.

Figure 5E:
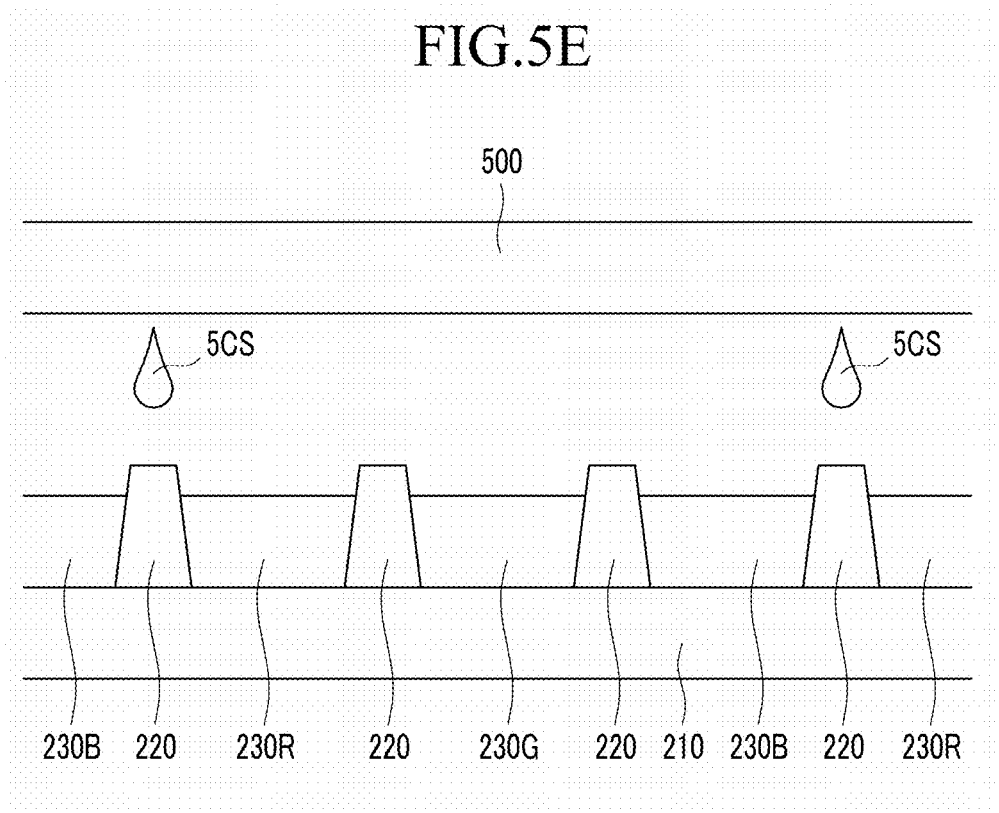

Referring to FIG. 5D, a third ink 5B for a third color filter 230B displaying blue as the third color among the color filters 230 is sprayed in the remaining openings 225 which are different from the first and second openings 225 of the substrate 210 which includes the first color filter 230R and the second color filter 230G. The printed third ink 5B for the third color filter 230B is hardened to evaporate the solvent of the third ink 5B thereby forming the third color filter 230B, as shown in FIG. 5E. The height h1 of the light blocking member 220 is in the range of about 1.5 to 2 times that of a thickness h2 of the third color filter 230B.

The depositing and/or hardening of the first ink 5R, the second ink 5G and/or the third ink 5B may be performed substantially simultaneously, or may be performed in a sequence.

Referring to FIG. 5E, after completing the color filters 230 including the first color filter 230R, the second color filter 230G, and the third color filter 230B, an ink 5CS for a spacer is dripped on a portion of the surface of the light blocking member 220 through nozzles of a head of the inkjet printing system 500. The ink 5CS for the spacer may include an acryl-based resin, cardo resin, or novolak resin, a binder, monomer, and a leveling agent. Ratios of the binder and the monomer included in the ink 5CS for the spacer and the content of the solvent are controlled such that the viscosity is increased, thereby forming the spacers 320 having a desired height on the surface of the light blocking member 220.

As shown in FIG. 5F, the sprayed ink 5CS for the spacers is hardened and dried to form the spacer 320. After spraying the ink 5CS for the spacer, the ink 5CS may be baked or irradiated by UV rays for the hardening.

Figure 5G:
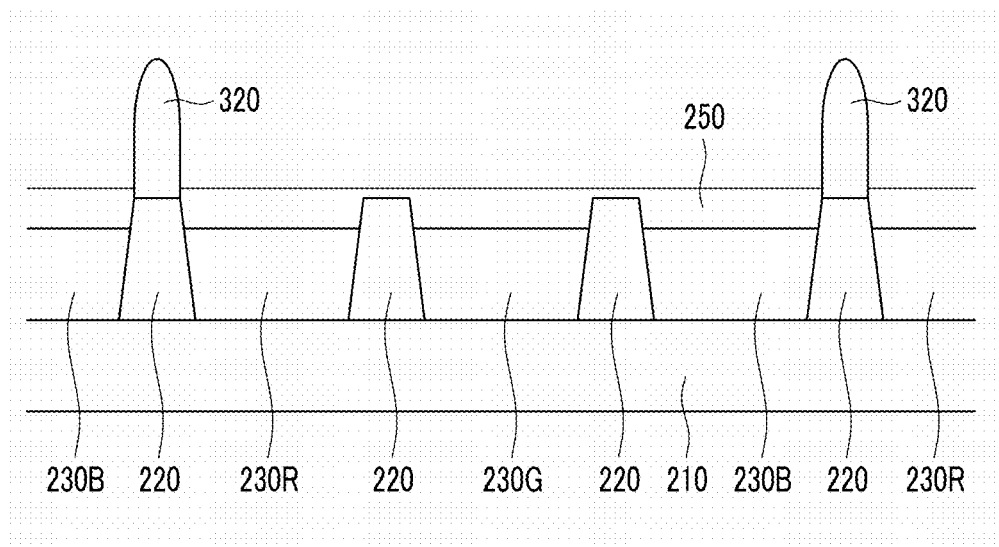

Referring to FIG. 5F, an ink 5OC for an overcoat is dripped on the substrate 210 including the light blocking member 220, the color filters 230, and the spacers 320 through the nozzles of the head of the inkjet printing system 500. The amount of the ink 5OC for the overcoat 250 is controlled to be deposited on the light blocking member 220 as well as the color filter 230 having the lower height h2 than the height h1 of the light blocking member 220, such that the overcoat 250 overlaps and covers an entire of the light blocking member 220 and the color filter 230, as shown in FIG. 5G.

A ratio of the binder and the monomer included in the ink 5OC for the overcoat 250 and the content of the solvent are controlled such that the viscosity is reduced and the repellant power against the surface of the light blocking member 220 and the color filter 230 is reduced, thereby forming the overcoat 250 including a substantially uniform surface on the surface of the light blocking member 220 and the color filter 230.

In an exemplary embodiment, the ink 5OC for the overcoat 250 preferably includes an organic material having viscosity of about 10 cp or less, and more preferably in a range of about 3 cp to about 5 cp, while the surface tension is preferably about 25 mN/m or less, and more preferably a range of about 20 mN/m to about 23 mN/m. If the viscosity of the material of the ink 5OC for the overcoat 250 is relatively high, and the surface tension thereof is relatively large such that the repellant power against the surface of the light blocking member 220 and the color filter 230 is increased, the forming of the planarized surface of the overcoat 250 by using the inkjet printing system is relatively difficult. However, the overcoat 250 of the liquid crystal display according to the illustrated exemplary embodiment of the present invention is formed of the ink 5OC for the overcoat having the viscosity of about 10 cp or less and the surface tension of about 25 mN/m or less by using the inkjet printing system, such that the overcoat 250 may be planarized.

In the illustrated exemplary embodiment, the overcoat 250 is formed by inkjet printing, however a spin coating method may alternatively be used.

A transparent conductor is deposited on the overcoat 250 and the spacer 320 to form a common electrode 270. In the step between the overcoat 250 and the spacer 320, the transparent conductor deposited on the spacer 320 and the transparent conductor deposited on the overcoat 250 may be disconnected from each other. If the transparent conductor deposited on the spacer 320 and the transparent conductor deposited on the overcoat 250 are connected to each other, the transparent conductor formed on the spacer 320 may be removed through etching.

Figure 6:
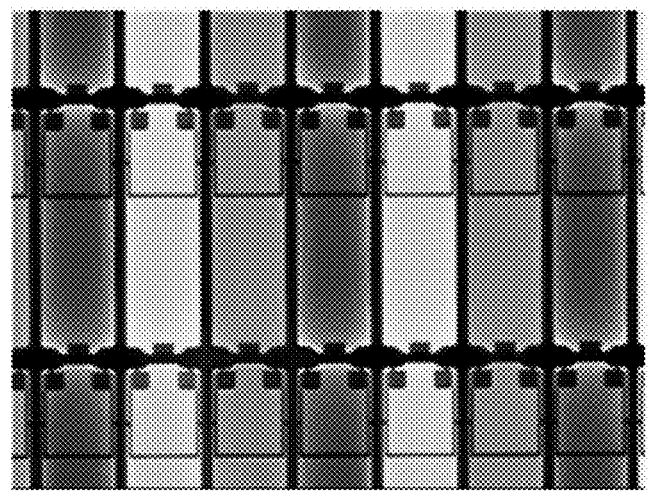
FIGS. 6a and 6b are pictures showing exemplary embodiments of color reproducibility of a liquid crystal display according to thickness of a light blocking member and a color filter.
Figure 6:
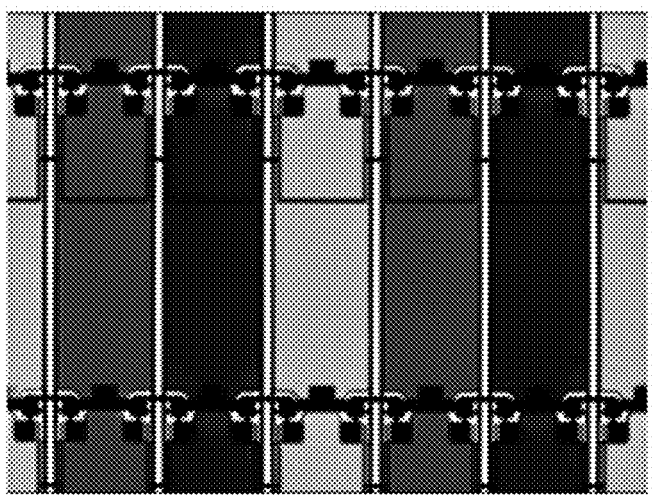

A color reproducibility of a liquid crystal display according to the height of the color filter 230 and the thickness the light blocking member 220 having a partition function forming the opening 225 enclosing the color filter 230, will be described with reference to FIG. 6. FIG. 6 is a view showing color reproducibility of a liquid crystal display according to an experimental example of the present invention. In FIG. 6(a) the light blocking member 220 and the color filter 230 have substantially the same height, and in FIG. 6(b) the height of the light blocking member 220 is about 1.5 times or more than the height of the color filter 230 as illustrated in an exemplary embodiment of the present invention.

When the color filter 230 is formed by using inkjet printing, the ink includes the solvent as well as the pigment forming the color filter 230, so that the amount of the ink sprayed from the nozzles of the inkjet head must be more than the amount of the ink that will be ultimately filled in the opening 225 to form the color filter 230, such that the height of the ink and solvent mixture is higher than the light blocking member 220 or with substantially the same height as the light blocking member 220. After printing, the ink, of the ink and solvent mixture, remains on the light blocking member 220 as well as in the opening 225. The light blocking member 220 has the large repellant power against the ink 5 of the liquid state such that the height of the ink 5 is reduced on the side wall of the light blocking member 220, and the height of the ink 5 is increased in the central portion of the opening. Accordingly, after evaporating the solvent of the ink 5, the height of the color filter 230 may be undesirably decreased on the side wall of the opening 225. Therefore, when forming the color filter 230 to be higher than the light blocking member 220 or with almost the same height as the light blocking member 220 as depicted in FIG. 6(a), the height of the color filter 230 is undesirably high in the central portion of the opening 225 and the height of the color filter 230 is relatively low on the side wall of the opening 225, thereby forming the color filter 230 of the dome shape.

However, when the height of the color filter 230 is lower than the height of the light blocking member 220 as depicted in FIG. 6(b), the amount of ink sprayed from the nozzles of the inkjet head may be relatively smaller than the amount of the ink which will ultimately be filled in the opening 225, such that the color filter 230 may be substantially uniformly spread in the opening 225. Advantageously, the surface of the color filter 230 may be planarized.

As shown in FIG. 6(a) illustrating the light blocking member 220 and the color filter 230 having substantially the same height, light leakage is undesirably generated at the edge portion of the pixel area. The light leakage is generated due to the color filter 230 being relatively lower on the edge portion of the pixel area edge. However, as in an exemplary embodiment of the present invention, as illustrated in FIG. 6(b), the height of the light blocking member 220 is about 1.5 times or more than that of the color filter 230, such that reproducibility of color having the substantially same brightness through the whole pixel area is achieved, and the light leakage is advantageously not generated at the edge of the pixel area edge.

The color filter 230 of a liquid crystal display panel having a substantially uniform thickness, according to an exemplary embodiment of the present invention is formed by the inkjet printing and has a height which is less than a height of the light blocking member 220 with the partition function. The height of the light blocking member 220 is in a range of about 1.5 to 2 times that of the height of the color filter 230, such that the light leakage of the pixel area edge may be advantageously reduced or effectively prevented.

A liquid crystal display including the color filter 230 having a substantially uniform thickness, may be formed by using light blocking members 220 having a height greater than the thickness of the color filter layer 230 during an inkjet printing or like manufacturing process. The color filter 230 having a substantially uniform thickness is considered a structural characteristic of the final liquid crystal display. Since the substantial uniformity of the thickness of the color filter 230 is imparted by the process of forming of the color filter 230 using the light blocking members 220 having the height greater than the thickness of the color filter layer 230, such a process of using the light blocking members 220 having the height greater than the thickness of the color filter layer 230 is considered to impart the distinct characteristic of the color filter 230 having a substantially uniform thickness in the liquid crystal display.

In an exemplary embodiment of a manufacturing method of the display panel 200 for the liquid crystal display according to the present invention, the exposure process and the developing process are advantageously omitted when compared with the photolithography process to form the spacer 320, such that the manufacturing time and cost may be reduced. Also, the spacer 320 fixed to the desired position may be relatively easily formed.

While this invention has been described in connection with what is presently considered to be practical exemplary embodiments, it will be apparent to those skilled in the art that various modifications and changes may be made thereto without departing from the scope and spirit of the invention. Accordingly, it is to be understood that the invention is not limited to the disclosed embodiments, but, on the contrary, is intended to cover various modifications and equivalent arrangements included within the spirit and scope of the appended claims.

What is claimed is:

1. A method for manufacturing a display panel for liquid crystal display, the method comprising:
   providing a substrate;
   forming a light blocking member on the substrate, the light blocking member having a height;
   forming a color filter having a substantially uniform thickness in a region defined by the light blocking member, the color filter formed through an inkjet printing method; and
   forming through the inkjet printing method, a spacer on the light blocking member and non-overlapping the color filter having the substantially uniform thickness in the region defined by the light blocking member having the height, the spacer non-overlapping the color filter by inkjet printing spacer material directly on the light blocking member which has the height and defines the region in which the color filter is formed, wherein the color filter has the substantially uniform thickness by the height of the light blocking member being larger than the thickness of the color filter during the inkjet printing method.

2. The method of claim 1, further comprising
forming an overcoat having a planarized surface on the light blocking member and the color filter by the inkjet printing method, the planarized overcoat overlapping an upper surface of the color filter having the substantially uniform thickness in the region defined by the light blocking member having the height, wherein the planarized overcoat overlapping the upper surface of the color filter extending into the region defined by the light blocking member having the height and in which the color filter is disposed.

3. The method of claim 2, wherein
the overcoat is formed by using the ink having a viscosity of about 10 centipoise (cp) or less, and a surface tension of about 25 millinewtons per meter (mN/m) or less.

4. The method of claim 2, wherein
the overcoat is formed by using the ink having a viscosity of about 3 centipoise (cp) to about 5 centipoise (cp), and a surface tension of about 20 millinewtons per meter (mN/m) to about 23 millinewtons per meter (mN/m).

5. The method of claim 2, further comprising
forming a common electrode on the overcoat.

6. The method of claim 5, wherein
the forming of the common electrode includes:
depositing a transparent conductive layer on the overcoat and the spacer, and
removing the transparent conductive layer on the spacer.

7. The method of claim 1, wherein
the height of the light blocking member is in a range of about 1.5 to about 2 times the thickness of the color filter.

8. The method of claim 2, wherein the forming the overcoat having the planarized surface comprises:
controlling material characteristics of an overcoat material for forming the overcoat, and
by the inkjet printing method, forming the overcoat material directly on both the color filter having the substantially uniform thickness and the light blocking member having the height larger than the thickness of the color filter.

\* \* \* \* \*